March 7, 1961 W. MINOWITZ 2,974,232
CALIBRATION CIRCUIT
Filed Nov. 29, 1956 2 Sheets-Sheet 1
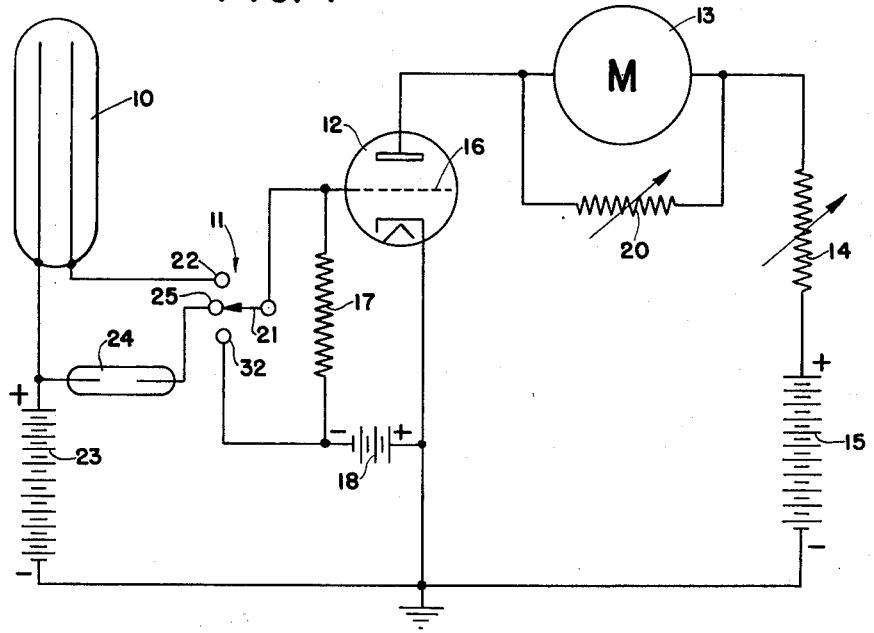
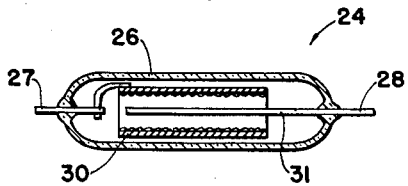
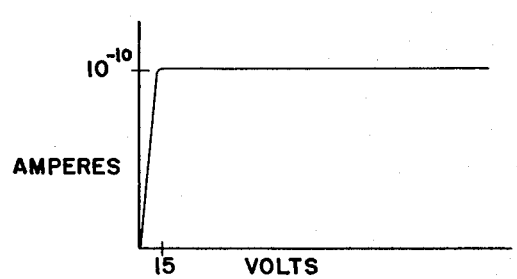
WILBERT MINOWITZ
INVENTOR
BY Ralph E. Bitner.
ATTORNEY March 7, 1961 W. MINOWITZ 2,974,232
CALIBRATION CIRCUIT Filed Nov. 29, 1956

WILBERT MINOWITZ
INVENTOR

BY Ralph E. Bitner

ATTORNEY

United States Patent Office 2,974,232
Patented Mar. 7, 1961

2,974,232

CALIBRATION CIRCUIT

Wilbert Minowitz, New York, N.Y., assignor, by mesne assignments, to Tung-Sol Electric Inc., Newark, N.J., a corporation of Delaware Filed Nov. 29, 1956, Ser. No. 625,048

5 Claims. (Cl. 250—83.6)

This invention relates to a calibration circuit for insuring the accuracy of measuring circuits which are sensitive to minute current values in their input circuits. The invention has particular reference to a calibration device which passes constant current within a wide range of impressed voltages, such a device being employed for calibration means in circuits generally employed for the measurement of pentrating radiation.

The use of ionization chambers for the measurement of penetrating radiation such as X-rays, alpha, beta, and gamma rays is well-known. Such circuits generally employ a vacuum tube with a sensitive meter in the anode-cathode circuit of the tube. The radiation sensitive element is generally coupled to the amplifier system either directly or in series with a large resistor. Such measuring circuits are difficult to calibrate because of the fact that the currents present in the input circuits of these devices are quite small, and any variations in tube characteristics, resistor values, and power supply voltages may cause large errors in the meter reading.

The present invention permits the easy calibration of the above described measuring circuits because it is essentially a constant current device which passes a very low current regardless of the applied voltage within wide limits.

The present invention is applied to the input circuit of the amplifying device employed and therefore checks the amplification of the amplifier as well as the calibration of the indicating instrument in the output circuit.

One of the objects of this invention is to provide an improved calibration circuit which avoids one or more of the disadvantages and limitations of prior art arrangements.

Another object of the invention is to provide a calibration circuit for sensitive radiation instruments which is insensitive to variations of applied voltage.

Another object of the invention to provide a calibration circuit for sensitive measuring instruments which is small in size and which can be added to a measuring instrument without appreciably increasing its size.

Another object of the invention is to provide a calibration circuit which will retain its current calibration for many years and is not subject to variations of temperature and pressure .

The invention comprises a gaseous discharge device which includes an envelope having two electrodes within the envelope space and a source of radiation such as radium which continually ionizes the gas within the envelope. This gaseous discharge device is connected by a switching means to the input of an amplifier which normally is connected to an ionization chamber and provides the amplifier with a small constant current for calibration purposes whenever desired.

For a better understanding of the present invention, together with other and further objects thereof, reference is made to the following description taken in connection with the accompanying drawings.

Fig. 1 is a schematic diagram of connections of a measuring circuit employing an ionization chamber and equipped with the calibration device of the present invention.

Fig. 2 is a detailed cross-sectional drawing of the constant current gaseous discharge device.

Fig. 3 is a graph showing a typical current-voltage characteristic of such a device.

Figure 4:
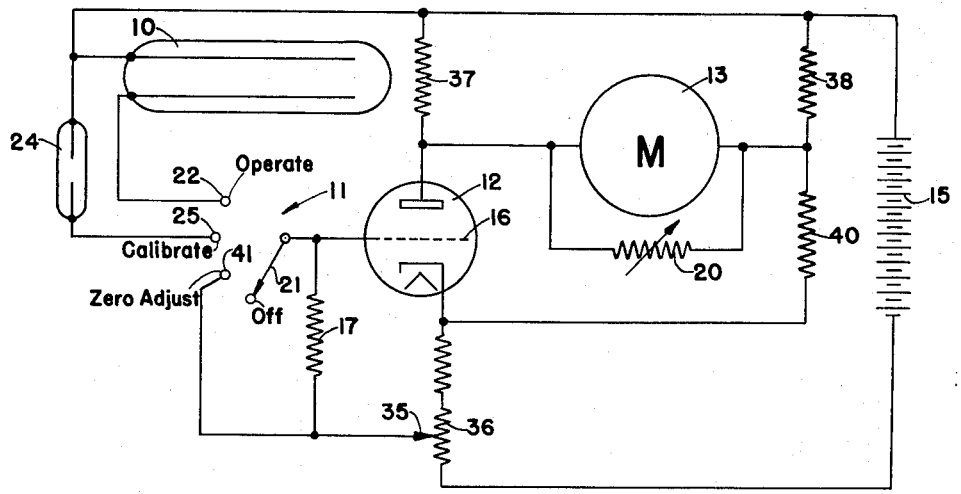
Figs. 4 and 5 are schematic diagrams of connection showing alternate circuits using the invention.

Referring now to the drawings, Fig. 1 shows the connections for a typical calibration circuit employing the ideas of this invention. The measuring circuit includes an ionization chamber 10 which may be connected through a selective switch 11 to an amplifier tube 12 (shown here as a triode). The anode circuit of tube 12 is connected in series with a meter 13, an adjustable resistor 14, and a source of potential 15, the negative terminal of the source of potential being connected to the cathode in tube 12. The control electrode 16 of amplifier tube 12 is connected in series with a high resistor 17 and a source of negative potential 18 in order to bias the amplifier tube so that it passes no current in the absence of an input voltage. The meter 13 may be shunted by an adjustable resistor to aid in the calibration of the device and to maintain a desired range on the meter scale.

When this circuit is in operation to measure penetrating radiation, a contact arm 21 in switch 11 is connected to contact point 22. Then the current through the ionization chamber 10 due to the external radiation and the electric field produced by the source of potential 23 will cause a voltage drop across resistor 17 raising the potential of the control electrode 16 and passing current through the tube to give an indication on meter 13.

Because of the low currents involved and because of the inherent difficulty of providing an accurate input signal, the calibration of such an instrument must be done in a laboratory where a known radiation field is available. Calibration is performed by turning switch arm 21 to contact 22, thereby connecting the ionization chamber 10 to the input circuit of tube 12. Resistors 20 and 14 are then adjusted so that the meter 13 indicates the value of the known field. Then the ionization chamber is removed from the field and switch arm is moved to contact 25, thereby connecting the calibration device 24 to the input circuit. The meter reading for this condition is marked on the meter dial or otherwise noted and becomes a permanent calibration value for the circuit and the discharge device 24.

The circuit may now be placed in service for measuring radiation fields. At any time the circuit calibration may be checked by turning switch arm 21 to contact 25 and noting the meter reading. If the reading corresponds to the value marked on the meter dial, the calibration is correct. If the meter shows a value different from the marked value, correction can be made by adjusting resistor 20.

The gaseous discharge device 24 is shown in detail in Fig. 2 and comprises an envelope 26, which may be made of glass, two lead-in conductors 27 and 28, and two electrodes within the envelope 30 and 31. A small quantity of radium salt (or any other source of ionizing radiation) is deposited in the envelope so that the penetrating radiation given off by this material causes ionization between the two electrodes. For this purpose radium bromide may be painted on the interior surface of electrode 30.

The volt-ampere characteristic of such a device is shown in Fig. 3. At low voltages, below 15 volts the current increases from zero to a maximum in a manner similar to other linear resistors. Above 20 volts the current is constant and retains this constant value within the range of 20 to about 220 volts above which value additional ionic collisions cause an additional ionization. If the source of potential 23 is maintained anywhere between the values of 20 and 200 volts the current flowing through device 24 and resistor 17 is a constant quantity which is not affected by temperature or external pressures and therefore provides a calibration current which may be relied upon. Contact point 32 is provided on switch 11 for turning the instrument to its nonconducting or off position.

The circuit diagram shown in Fig. 4 includes the same ionization chamber 10, a selective switch 11, which in this case has an added "zero adjust" contact point. An amplifier tube 12 and a meter 13 are provided as before. The zero adjustment is made by first turning contact arm 21 to the "zero adjust" contact 41 and then moving contact arm 35 on resistor 36 until the meter 13 reads zero. This circuit employs only one anode source of potential 15 which supplies amplifier tube 12 with its anode-cathode current and also supplies the ionization chamber 10 and the discharge device 24 with sufficient voltage for their operation. The meter 13 is connected between opposite junction points of a four-armed Wheatstone bridge, resistors 37, 38, and 40 forming three arms thereof and the vacuum tube 12 forming the fourth.

The operation of this circuit is similar to the operation of the circuit shown in Fig. 1. After the zero has been adjusted, arm 21 is moved to contact 25 to connect calibration device 24 to the input circuit and the meter circuit is adjusted as before. Then the arm 21 is moved to contact 22 and the device is ready for measuring the intensity of radiation fields.

Figure 5:
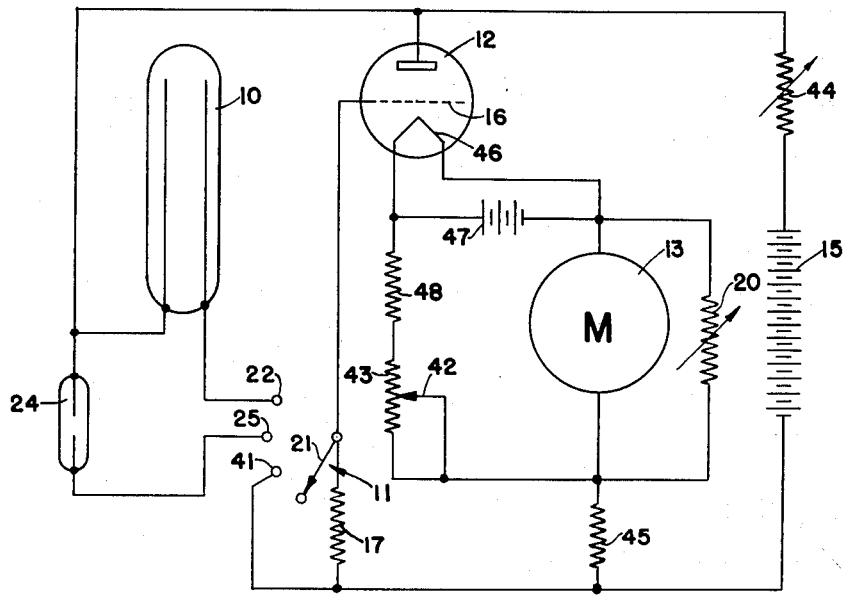

The circuit shown in Fig. 5 is still another form of circuit which in this case employs the cathode follower type of tube circuit. The "zero adjust" operation is made by moving contact arm 21 to point 41 and then moving contact arm 42 on resistor 43 until meter 13 reads zero. When this circuit is calibrated, arm 21 is turned to contact 25 as usual and resistor 20 is varied to get the proper meter reading. The amplifier tube 12 in Fig. 5 contains a filamentary cathode 46 which is supplied by a battery 47. The current from battery 47, through meter 13, resistor 43, and resistor 48 acts in opposition to the current from source of potential 15 which sends current through resistor 44, amplifier tube 12, meter 13, and resistor 45.

The foregoing disclosure and drawings are illustrative of the principles of the invention and are not to be interpreted in a limiting sense. The calibration circuit may be applied to any measuring circuit employing a meter coupled to an amplifier. The only limitations are to be determined from the scope of the appended claims.

I claim:

1. A measuring circuit and calibration means therefor comprising, a measuring instrument, an amplifier, indicating means connected to the output of the amplifier, a constant current gaseous discharge device, a multiple position switch adapted in one position to connect said constant current device to the input of said amplifier for calibration of the indicating means, and in another position to disconnect said constant current device from the amplifier and to connect said measuring instrument to the input of the amplifier, and a source of operating energy for said circuit and calibrating means.

2. A measuring circuit and calibration means therefor comprising; a measuring instrument; an amplifier; indicating means connected to the output of the amplifier; a constant current gaseous discharge device which includes an envelope, two electrodes within the envelope, and a source of gas ionization also within the envelope; a multiple position switch adapted in one position to connect said constant current device to the input of said amplifier for calibration of the indicating means, and in another position to disconnect said constant current device from the amplifier and to connect said measuring instrument to the input of the amplifier, and a source of operating energy for said circuit and calibrating means.

3. A measuring circuit and calibration means therefor comprising, a measuring instrument, an amplifier, indicating means connected to the output of the amplifier, a constant current gaseous discharge device, a multiple position switch adapted in one position to connect said constant current device to the input of said amplifier for producing a calibration current in the indicating means, and in another position to disconnect said constant current device from the amplifier and to connect said measuring instrument to the input of the amplifier for producing a measuring current proportional to a change in the operating characteristics of the measuring instrument, and a source of operating energy for said circuit and calibrating means.

4. A measuring circuit and calibration means therefor comprising, an ionization chamber, an amplifier, a current indicating means connected to the output of the amplifier, a constant current gaseous discharge device, a multiple position switch adapted in one position to connect said constant current device to the input of said amplifier for calibration of the current indicating means, and in another position to disconnect said constant current device from the amplifier and to connect said ionization chamber to the input of the amplifier for measuring penetrating radiation, and a source of operating energy for said circuit and calibrating means.

5. A measuring circuit for measuring penetrating radiation and calibrating means therefor comprising, an ionization chamber, an amplifier, a current indicating means connected to the output of the amplifier, a constant current gaseous discharge which includes an envelope, two electrodes within the envelope, and a source of gas ionization also within the envelope, a multiple position switch adapted in one position to connect said constant current device to the input of said amplifier for calibration of the current indicating means, and in another position to disconnect said constant current device from the amplifier and to connect said ionization chamber to the input of the amplifier for producing a measuring current proportional to the gas ionization in the ionization chamber, and a source of operating energy for said circuit and calibrating means.

References Cited in the file of this patent

UNITED STATES PATENTS

| | | |
|---|---|---|
| 2,643,343 | Rainwater | June 23, 1953 |
| 2,651,726 | Froman et al. | Sept. 8, 1953 |
| 2,666,857 | McLaren et al. | Jan. 19, 1954 |
| 2,700,110 | Shamos | Jan. 18, 1955 |